(No Model.)
J. A. CARLSON.
MEAT POUNDER.
No. 489,928. Patented Jan. 17, 1893.
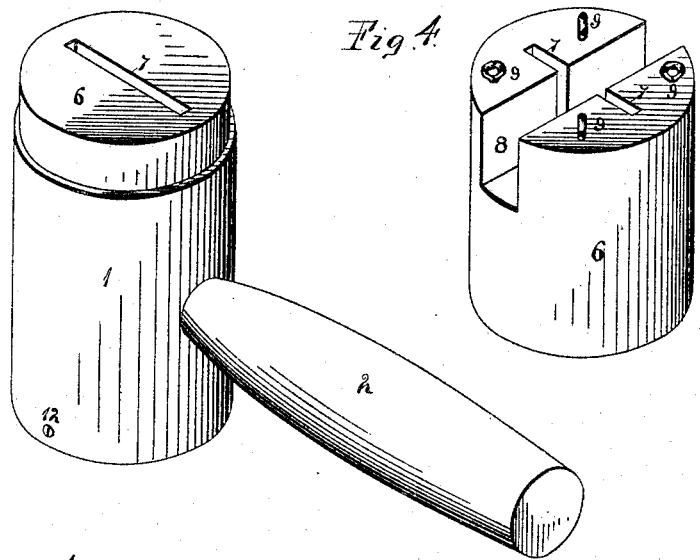
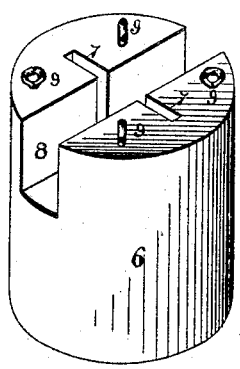
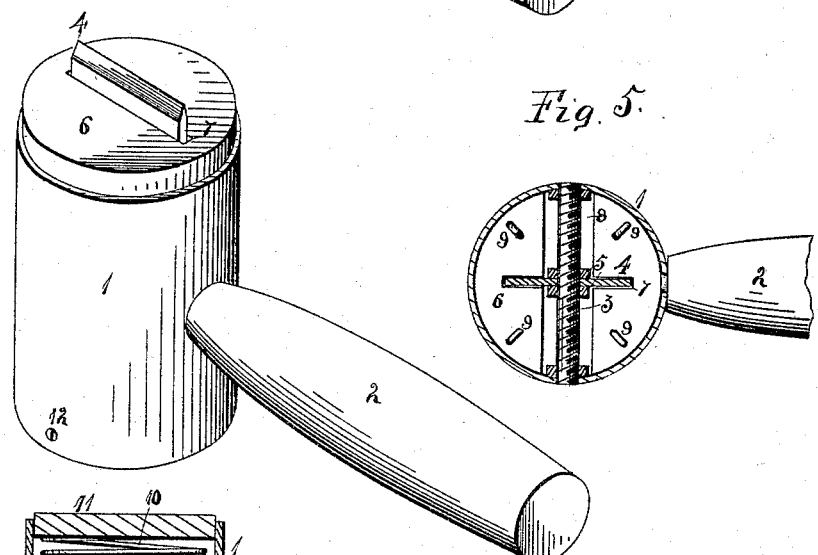
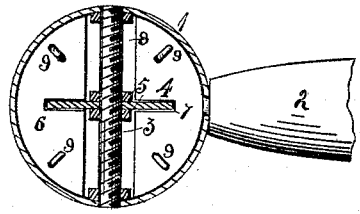
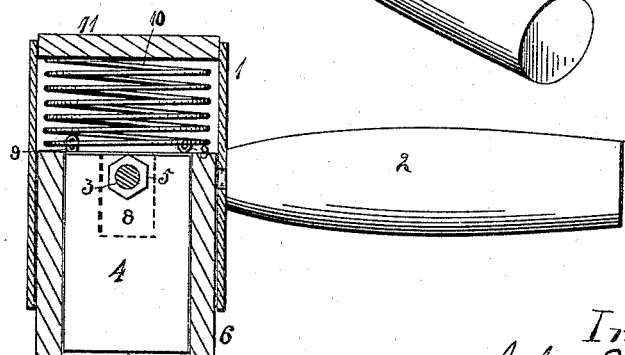
Witnesses:
J. S. Clark
L. A. Clark
Inventor:
John A. Carlson
By A. O. Behel
Attys.

UNITED STATES PATENT OFFICE.

JOHN A. CARLSON, OF ROCKFORD, ILLINOIS.

MEAT-POUNDER.

SPECIFICATION forming part of Letters Patent No. 489,928, dated January 17, 1893.

Application filed August 29, 1892. Serial No. 444,377. (No model.)

*To all whom it may concern:*

Be it known that I, JOHN A. CARLSON, a subject of the King of Sweden and Norway, residing at Rockford, in the county of Winnebago and State of Illinois, have invented certain new and useful Improvements in Meat-Tenderers, of which the following is a specification.

The object of my invention is to provide a meat pounder which has a blade and a shield for the blade, projecting slightly beyond the edge of the blade, said shield or plunger held in a yielding manner by a spring, so that in the use of the pounder the plunger will yield sufficiently to allow the blade to penetrate the meat, thereby at a single stroke of the pounder the meat is cut and compressed.

In the accompanying drawings—Figure 1 is an isometrical representation of my meat tenderer in which the parts are in their normal position. Fig. 2 is an isometrical representation of my meat pounder in which the plunger is moved inward, allowing the knife to protrude. Fig. 3 is a vertical central section. Fig. 4 is an isometrical representation of the yielding plunger removed from the case. Fig. 5 is a transverse section of the pounder.

My improved pounder consists of the outside, cylindrical shell 1, having a handle 2 secured thereto about midway of its length. At right angles to the handle and extending centrally across the shell is located a central bolt 3, having outside nuts to hold it in position with reference to the shell. A blade 4 is perforated near its upper end and is located on the central bolt 3, on each side of this blade are turned nuts 5, which hold the blade centrally within the shell. This blade extends downward and some distance beyond the end of the shell, having its free end sharpened in knife form. A plunger 6, fits the inside of the shell and is provided with a lengthwise slot 7, the width and thickness of the blade. The inner end of this plunger is also provided with a slot 8, large enough to allow the nuts 5 and central bolt 3 to enter. A series of screw eyes 9 are turned in the inner end of the plunger and a coil spring 10 has a connection with the plunger by its coil turning in the screw eyes. A cap or plug 11 is located in the upper end of the shell and is held in place by screws 12. By this connection between the spring and plunger, the plunger is held in its outer position, as shown at Fig. 1, and the plunger is prevented from dropping out by the coils of the spring resting on top of the central bolt 3.

In use, when a blow is struck with the pounder sufficiently to force the plunger within the shell against the spring action, allowing the blade to enter the meat, the force of the plunger upon the meat in connection with the blade, will divide the fibers of the meat.

I claim as my invention—

A meat tenderer, consisting of an outside shell, having a closed end, a transverse shaft having a connection with the shell, a blade having a connection with the shaft, a plunger located within the open end of the shell and a spring having a connection with the plunger and resting against the closed end of the shell.

JOHN A. CARLSON.

Witnesses:
 G. CARLSON,
 A. O. BEHEL.